US012567261B2

(12) United States Patent
Pfeil

(10) Patent No.: US 12,567,261 B2
(45) Date of Patent: Mar. 3, 2026

(54) METHOD FOR AUTOMATIC OBJECT AND/OR SEGMENT LABELING OF SENSOR TARGET DATA, USE OF SUCH LABELED SENSOR TARGET DATA, COMPUTER PROGRAM, AND CONTROL DEVICE OR CENTRAL OR ZONAL COMPUTING MODULE

(71) Applicant: Robert Bosch GmbH, Stuttgart (DE)

(72) Inventor: Jerg Pfeil, Cleebronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 368 days.

(21) Appl. No.: 18/324,002

(22) Filed: May 25, 2023

(65) Prior Publication Data

US 2023/0386220 A1 Nov. 30, 2023

(30) Foreign Application Priority Data

May 30, 2022 (DE) ..................... 10 2022 205 341.9

(51) Int. Cl.
| | |
|---|---|
| *G06V 20/56* | (2022.01) |
| *G06T 7/70* | (2017.01) |
| *G06V 10/764* | (2022.01) |
| *G06V 10/774* | (2022.01) |

(52) U.S. Cl.
CPC .............. *G06V 20/56* (2022.01); *G06T 7/70* (2017.01); *G06V 10/764* (2022.01); *G06V 10/774* (2022.01); *G06T 2207/30252* (2013.01)

(58) Field of Classification Search
None
See application file for complete search history.

(56) References Cited

U.S. PATENT DOCUMENTS

| | | | |
|---|---|---|---|
| 2018/0314921 A1* | 11/2018 | Mercep | ................... G01S 15/86 |
| 2022/0189054 A1* | 6/2022 | Kaiser | .................. G06V 20/582 |
| 2022/0327719 A1* | 10/2022 | Shaag | ................... G01S 7/4817 |

OTHER PUBLICATIONS

Bieshaar et al ("A Concept for Highly Automated Pre-Labeling via Cross-Domain Label Transfer for Perception in Autonomous Driving," (2021); pp. 65-69) (Year: 2021).*

(Continued)

*Primary Examiner* — Leon Viet Q Nguyen
(74) *Attorney, Agent, or Firm* — NORTON ROSE FULBRIGHT US LLP

(57) ABSTRACT

A method for automatic object and/or segment labeling of sensor target data of at least one vehicle target sensor. The method comprises first capturing of at least one sequence of camera images; generating an environment representation of the vehicle as a function of the captured sequence; recognizing at least one object in the environment by a learned machine recognition method as a function of a captured camera image; ascertaining an estimated position of the object as a function of the camera image; classifying a point of the environment representation based on the recognized object and the ascertained estimated position; and second capturing of distance data using at least one distance sensor. The generated environment representation is adjusted as a function of the captured distance data. A calculation of a synthetic image of the environment from a virtual perspective of observation takes place based on the adjusted environment representation.

12 Claims, 4 Drawing Sheets

(56)                References Cited

OTHER PUBLICATIONS

Zhang, et al.: "VI-DAS Vision Inspired Driver Assistance System", European Commission, Innovation and Networks Executive Agency, Horizon 2020 Research & Innovation Programme, (2019), pp. 1-19, https://ec.europa.eu/research/participants/documents/downloadPublic? docu mentlds=080166e5c480acfO&appl d = PPGMS.

Zhao, et al.: "A fully end-to-end deep learning approach for real-time simultaneous 3D reconstruction and material recognition," Proceedings of the 2017 18th International Conference on Advanced Robotics (ICAR), Hong Kong, China (2017), pp. 75-82.

Bieshaar et al. "A Concept for Highly Automated Pre-Labeling via Cross-Domain Label Transfer for Perception in Autonomous Driving," (2021); pp. 65-69.

Gustafson. "Statistical Sensor Fusion" Studentlitteratur (2018).

* cited by examiner

FIG. 4

METHOD FOR AUTOMATIC OBJECT AND/OR SEGMENT LABELING OF SENSOR TARGET DATA, USE OF SUCH LABELED SENSOR TARGET DATA, COMPUTER PROGRAM, AND CONTROL DEVICE OR CENTRAL OR ZONAL COMPUTING MODULE

CROSS REFERENCE

The present application claims the benefit under 35 U.S.C. § 119 of German Patent Application No. DE 10 2022 205 341.9 filed on May 30, 2022, which is expressly incorporated herein by reference in its entirety.

FIELD

The present invention relates to a method for automatic object and/or segment labeling of sensor target data of at least one vehicle target sensor, wherein the vehicle comprises at least one vehicle camera and one distance sensor. The present invention also relates to a use of the sensor target data labeled according to the present invention for training a machine recognition method. Furthermore, the present invention relates to a computer program comprising instructions that, when the program is executed by a computer, cause the computer to perform the steps of the method according to the present invention. Moreover, the present invention relates to a control device or a central or zonal computing module comprising a computing unit configured to perform the steps of the method according to the present invention.

BACKGROUND INFORMATION

The paper Gustafsson, F. (2010), "Statistical sensor fusion,' 1st ed., Lund, Student Literature, p. 532 describes the fusion of information from two or more sensors.

The paper by Bieshaar, M. et al. (2021), "A Concept for Highly Automated Pre-Labeling via Cross-Domain Label Transfer for Perception in Autonomous Driving," in: *Workshop on Interactive Adaptive Learning (IAL)*, ECML PKDD describes an automatic pre-classification of objects by learned machine recognition methods or learned object detectors, in particular neural networks, for the respective sensor target data based on camera images and/or based on sensor target data of a lidar sensor. In addition to recognizing the pre-classification, coordinates and the size of a respective three-dimensional bounding box as well as a yaw angle can also be determined. It may be provided that ascertained pre-classifications of the recognized objects, which are based on different sensor types, as well as their associated probabilities, are compared to one another or fused.

Static objects in the environment of a vehicle within the meaning of this present invention are, for example, trees, shrubs, parked vehicles, traffic lights, lantern poles, bollards, curbs, uprights, pillars, stones, and so forth. Advantageously, static objects are of the same or a smaller size relative to the vehicle. Static objects do not move, at least at the current time, e.g., parked vehicles, or cannot move in principle, e.g., traffic lights or lantern poles.

Dynamic objects in the environment of a vehicle within the meaning of this present invention are, for example, people or pedestrians, and/or other moving, in particular driving, motor vehicles, bicycles, balls, animals, and so forth. Segments in the environment of a vehicle within the meaning of the present invention are, for example, a roadway surface on which the vehicle can drive, such as a road and/or parking lot areas, non-drivable parts of the environment, such as green areas or occupied parking lots, other parked vehicles, parts of buildings, the sky, and so forth.

Top-down views, or bird's eye views, perpendicularly downward based on images of a vehicle camera oriented toward the environment are described in the related art. In this case, fixed mapping rules between pixels are typically used in order to convert the captured image into the displayed image of the top-down view based on known properties of the lens. These mapping rules or coordinate transformations or lookup tables or transformation matrices, for example, dewarp an image of a wide-angle lens of a wide-angle camera and advantageously change the perspective of observation. Also known are changes of the virtual perspectives of observation, for example in the view of a surround-view model in vehicles.

An object of the present invention is to improve automatic object and/or segment labeling of captured sensor target data.

SUMMARY

The above object may be achieved according to the present invention.

The present invention relates to a method for automatic object and/or segment labeling or for automatic labeling of sensor target data of at least one vehicle target sensor. The vehicle comprises at least one vehicle camera. The vehicle camera is preferably at least one mono or stereo camera. The vehicle also comprises at least one distance sensor, wherein the distance sensor is, for example, a lidar, radar, and/or ultrasonic sensor. The distance sensor is preferably an active sensor, which sends a transmission signal, e.g., a laser beam, a radar signal or an ultrasonic signal. The distance sensor advantageously receives the signal reflected on objects in the environment of the vehicle and related to the sent transmission signal. Advantageously, a distance between the vehicle and an object point and/or a position of the object point of the object in the environment of the vehicle can be ascertained from the transit time of the reflected signal, or of the reflection signal.

According to an example embodiment of the present invention, the method comprises a first capture of at least one sequence of camera images by means of the vehicle camera of the vehicle. Subsequently, an at least two-dimensional map of the environment of the vehicle, or an environment representation, is generated as a function of the at least one captured sequence of camera images, for example by an image-based structure-from-motion method or by an image-based stereo method. The generated environment representation, or map, comprises a plurality of points of the environment representation, or map points, each representing a position of a point of an object in the environment of the vehicle, in particular relative to the vehicle. The positions of the points of the environment representation, or map points, are determined as a function of an ascertained camera-based distance of a respective object point to the vehicle, wherein the camera-based distance of the object point is ascertained as a function of the at least one captured sequence of camera images. The method also comprises a recognition of at least one static or dynamic object and/or of one segment in the environment of the vehicle by a learned machine recognition method as a function of at least one camera image of the captured sequence of camera images. Subsequently, an estimated position of the recognized static or dynamic object and/or a position range of the recognized segment in the environment of the vehicle is ascertained as a function of the at least one camera image of the captured sequence of camera images. The estimated position is ascertained according to the related art. The estimated position may, for example, be ascertained by a base-point determination or may be recognized by another learned machine recognition method. Thereafter, at least one point of the generated environment representation, or map point of the generated map, is classified based on the at least one recognized object and as a function of the ascertained estimated position of the recognized object and/or based on the recognized segment and based on the ascertained position range of the segment, wherein the classification is mapped to the respective point, or map point, and saved. In other words, the environment representation comprises points, or the map comprises map points, representing distance information of object points in the environment of the vehicle, wherein a classification of the associated recognized object and/or the associated segment is mapped to the map points. Optionally, it may be provided that the environment representation, or map, comprises several layers or comprises several sub-maps, e.g., a first sub-map for static objects and/or a second sub-map for dynamic objects and/or a third sub-map for segments. It may optionally be provided that the environment representation, or map, and/or the first, second and/or third sub-maps are in the form of a list, wherein the coordinates of the map points are stored with the respective classification in the respective list. The second sub-map may, for example, comprise at least one current position, a current direction of movement, and a current speed of the respective dynamic object in list form. In addition, the method comprises a second capture of distance data by means of the at least one distance sensor, wherein the second capture in particular takes place continuously and simultaneously with the first capture. The second capture in particular takes place by means of the active distance sensor. Preferably, a second capture of distance data is provided by means of at least two distance sensors, wherein the distance sensors are of a different sensor type; for example, a radar sensor, a lidar sensor and/or an ultrasonic sensor are provided as distance sensors on the vehicle. According to the present invention, the generated environment representation, or map, is subsequently adjusted, or changed, as a function of the captured distance data. In other words, the environment representation, or map, is generated based on the captured camera data of the vehicle camera and adjusted based on the captured distance data of the at least one distance sensor, whereby the position of the points of the environment representation, or the position of the map points, as the representation of the object points in the environment of the vehicle, is ascertained more accurately than if the environment representation, or map, were determined only as a function of a vehicle camera. In other words, the combination of the map, generated in a camera-based manner, with the information of the distance data advantageously results in a sensor fusion, whereby the position of the points of the environment representation, or map points, can be ascertained more accurately or validated and the map, or the environment representation, is preferably improved overall. Thereafter, a synthetic image of the environment from a virtual perspective of observation is ascertained, or calculated, based on the adjusted environment representation, or adjusted map, wherein the virtual perspective of observation represents a position and an orientation of the vehicle target sensor, whose captured sensor target data are automatically labeled, on the vehicle. The calculated synthetic image in particular comprises depth information for a respective pixel and the classification of the point of the environment representation, or map point, as additional information for a respective corresponding pixel of the synthetic image. The synthetic image advantageously additionally, but not necessarily, comprises a distortion of the environment corresponding to a lens of the vehicle target sensor. In the related art, when ascertaining views from a different perspective of observation for an environmental model, no classifications or additional information for the pixels have been transferred or determined so far. Subsequently, the sensor target data captured by the vehicle target sensor are labeled based on the calculated synthetic image, in particular based on the additional information of the respective pixel of the synthetic image corresponding to the depth information and/or classification of the corresponding point of the environment representation, or map point. Thus, the present invention results in an automatic and accurate labeling or classification of sensor target data of a vehicle target sensor, in particular with respect to present dynamic or static objects as well as segments in the environment of the vehicle or in the captured sensor target data which represents the environment of the vehicle. The vehicle target sensor is preferably an additional sensor, which captures further sensor target data continuously and simultaneously with the first and second captures; for example, the vehicle target sensor is a mono vehicle camera arranged on the vehicle. The method is preferably performed by means of a high-resolution vehicle camera and a plurality of distance sensors in order to generate the labeled sensor target data as high-quality training data for a machine recognition method for sensor target data of the vehicle target sensor.

Preferably, according to an example embodiment of the present invention, the adjustment of the environment representation, or the map, takes place by changing a position of a point of the environment representation, or map point, in the capture direction of the distance sensor to the respective point, or map point, as a function of the distance, captured in this capture direction, of the captured distance data and/or as a function of a distance, statistically averaged in a range around this capture direction, of the captured distance data. This results in the advantage that the map, or environment representation, is adjusted based on the distance ascertained more accurately in this capture direction by means of the distance sensor in comparison to the camera-based distance capture, wherein the camera-based higher accuracy in the angular resolution by the camera-based distance determination methods is maintained at the same time. As a result, the information with respect to the positions of the points, or map points, representing the object points becomes more accurate so that the sensor target data is labeled in an improved manner.

In a continuation of the present invention, at least one reflection property is ascertained as a function of the captured distance data, wherein the reflection property represents in particular a probability for the presence of a dynamic or static object and/or of a segment and is ascertained from the distance data as a function of a received reflection signal. The received reflection signal advantageously comprises information about the reflection origin location; for example, depending on the sensor type of the distance sensor, a received amplitude and/or a time course of the reflection signal and/or a frequency distribution in the reflection signal differ, in particular in comparison to the sent transmission signal, depending on whether the reflection took place on a wall, on a parked vehicle, on a tree, on a plant or on a pedestrian. Different sensor data from different sensor types of the distance sensor may also have different characteristic combinations of reflection properties for an object class, or a dynamic or static object, and/or a segment class, or a segment. For example, a reflected amplitude of an ultrasonic signal and of radar sensor on a pedestrian may typically be reduced relative to the sent ultrasonic signal in comparison to a reflection on a wall, whereas the received reflection signal of a lidar sensor as a distance sensor is not reduced in amplitude on the pedestrian. Optionally, the at least one reflection property may be evaluated, as a function of the captured distance data, by a learned machine recognition method, in particular a neural network, with respect to the likelihood of the reflection origin location. In other words, based on the at least one ascertained reflection property, it is automatically recognized, or ascertained, whether a probability that the reflection origin location is a dynamic object or a static object and/or a segment is high, and if so, advantageously which segment is associated with the reflection origin location. The environment representation, or map, is subsequently adjusted additionally as a function of at least one determined reflection property, wherein the position of a point, or map point, is only adjusted as a function of a distance if the reflection property of the distance data at this point correlates with the mapped classification of the point of the environment representation, or map point. This has the result that points of the environment representation, or map points, are not incorrectly adjusted, which could occur, for example, when a pedestrian moves on a curb and the reflection signals thus originate from an environmental area of a static and a dynamic object. In other words, in this continuation, the association of the respective reflection signals with the reflection origin locations is improved and the accuracy of the environment representation, or map, is thus increased so that the sensor target data can be labeled more reliably, or in an improved manner, based on the more accurate environment representation.

According to an example embodiment of the present invention, it may be provided that the vehicle target sensor whose sensor target data are being labeled is the vehicle camera and/or the distance sensor and/or, in particular, another active or passive sensor of the vehicle. In other words, the vehicle target sensor may in principle be any sensor that is arranged on the vehicle and monitors, or captures, the environment of the vehicle. If the vehicle target sensor is the other active or passive sensor of the vehicle, an additional further capture of the sensor target data from the environment of the vehicle takes place by means of the other active or passive sensor. The vehicle target sensor is particularly advantageously an additional mono vehicle camera, wherein the vehicle camera is a stereo camera, which in particular comprises two high-resolution vehicle cameras. The vehicle target sensor may, additionally or alternatively, preferably be at least one of the distance sensors. In other words, the method can advantageously obtain several labeled sensor target data for different sensor types or sensor attachment positions of the respective vehicle target sensor at the same time, in particular as training data for a learned machine recognition method.

In a further embodiment of the method of the present invention, map data of a map service are provided, wherein the map data of the map service are in particular either loaded from memory or received from a server device. The environment representation, or map, generated based on the first and/or the second capture or the surroundings capture is subsequently additionally adjusted as a function of the provided map data, wherein the adjustment of the environment representation as a function of the provided map data preferably additionally takes place as a function of a world position of the vehicle. The world position is advantageously determined by position determination based on a global navigation satellite system (GNSS) and/or based on odometry data of the vehicle and/or by other conventional locating methods. This embodiment increases the accuracy of the adjusted environment representation, and additional information can be stored in the environment representation, created by the surroundings capture, for, in particular, static objects or segments, e.g., also about the status of a segment, such as danger of black ice for a roadway segment, or, for example, more accurate type information and/or contact information for a static or dynamic object, so that the sensor target data can be labeled in an improved manner.

In another configuration of the present invention, the labeled sensor target data of the vehicle target sensor are displayed as information about the environment for a user of the vehicle, in particular in an environmental model or surround-view model of the vehicle. In this display, the labeling or the additional information is presented to the user, for example in the display of the environmental model. In this case, at least four vehicle target cameras of a surround-view system may, for example, be provided, wherein the sensor target data of these vehicle target cameras of the surround-view system are labeled by an adjusted map, which is generated by an additional stereo camera as a vehicle camera and is adjusted based on at least one lidar sensor and/or radar sensor and ultrasonic sensors as distance sensors. For example, the additional information may be presented in the displayed surround view of this example by a color adjustment, shading or blurring of the displayed textures or images in the surround view based on an ascertained relevance for the current driving situation. Additionally or alternatively, a projection surface of the surround-view model onto which the textures are projected can be changed as a function of the depth information and the additional information, wherein, for example, projection surfaces are shifted for static objects but not for dynamic objects. Dynamic objects can instead be loaded as synthetic objects from an electronic memory and inserted. This advantageously creates a display of the environmental model that is easily understood by the user.

In a preferred embodiment of the present invention, the synthetic image is calculated by a fixed or predetermined mapping rule, for example by a transformation matrix, from the virtual perspective of observation based on the adjusted environment representation, or map. The vehicle target camera is typically arranged on the vehicle at a fixed attachment position with a fixed orientation of the coverage range. This attachment position and orientation of the vehicle target camera defines the mapping rule, i.e., the mapping rule is thereby specified or predetermined. The fixed arrangement and orientation of the vehicle target camera allows the preferably two-dimensional or three-dimensional synthetic image of the environment from a virtual perspective of observation corresponding to the orientation of the vehicle target camera at the attachment position on the real vehicle to be calculated from a two-dimensional or three-dimensional environment representation, or map. The synthetic image from the virtual perspective of observation thus comprises information that can be directly transferred to the captured sensor target data, i.e., the synthetic image contains the, in particular pixel-based, information as to which object and/or segment is present in the sensor target data at what distance. The synthetic image can be created, or calculated, as a function of a lens used in the vehicle target sensor, i.e., the synthetic image can, for example, simulate or contain the distortion of a wide-angle camera. The synthetic image of the environment from the virtual perspective of observation thus contains a pixel-precise mapping of the additional information for labeling the sensor target data.

In an optional configuration of the present invention, the captured sensor target data are labeled based on the calculated synthetic image in that the synthetic image of at least one capture cycle is mapped to the sensor target data. In other words, the synthetic image is advantageously generated, or ascertained, at a predetermined frequency, wherein the first capture and the second capture are preferably carried out at a higher frequency than the predetermined frequency. The additional information of the synthetic image is preferably transferred to the sensor target data based on the pixel coordinates, in particular at the predetermined frequency. Preferably, the sensor target data are also labeled at the predetermined frequency or at a lower frequency than the predetermined frequency. This optional configuration generates labeled sensor target data of a very high quality, in particular for use as training data for a machine recognition method.

In addition, according to an example embodiment of the present invention, it is advantageously provided that the labeling of the captured sensor target data based on the calculated synthetic image takes place with a time delay. In other words, the captured sensor target data are stored in an electronic memory and labeled based on the calculated synthetic image with a delay, or after a lag time period. During the lag time period, the other method steps up to the calculation of the synthetic image are carried out, in particular the generation and adjustment of the map and the calculation of the synthetic image.

The present invention also relates to a use of the sensor target data labeled according to the method according to the present invention, for training a machine recognition method, in particular a neural network.

Furthermore, the present invention relates to a computer program comprising instructions that, when the program is executed by a computer, cause the computer to perform the steps of the method according to the present invention.

In addition, the present invention relates to a control device or central or zonal computing module comprising a first signal input for providing a first signal representing at least one sequence of camera images that is captured by means of a vehicle camera. According to an example embodiment of the present invention, the control device or the central or zonal computing module also comprises a second signal input for providing a second signal representing distance data captured by means of at least one distance sensor. Furthermore, the control device or the central or zonal computing module comprises a computing unit, in particular a processor, configured to perform the steps of the method according to the present invention.

The present invention also relates to a system, in particular to a vehicle, comprising the control device according to the present invention or the central or zonal computing module according to the present invention.

Further advantages emerge from the following description of exemplary embodiments of the present invention with reference to the figures.

BRIEF DESCRIPTION OF THE DRAWINGS

FIG. 4 shows a virtual perspective of observation, and synthetic image, according to an example embodiment of the present invention.

BRIEF DESCRIPTION OF THE DRAWINGS

Figure 1:
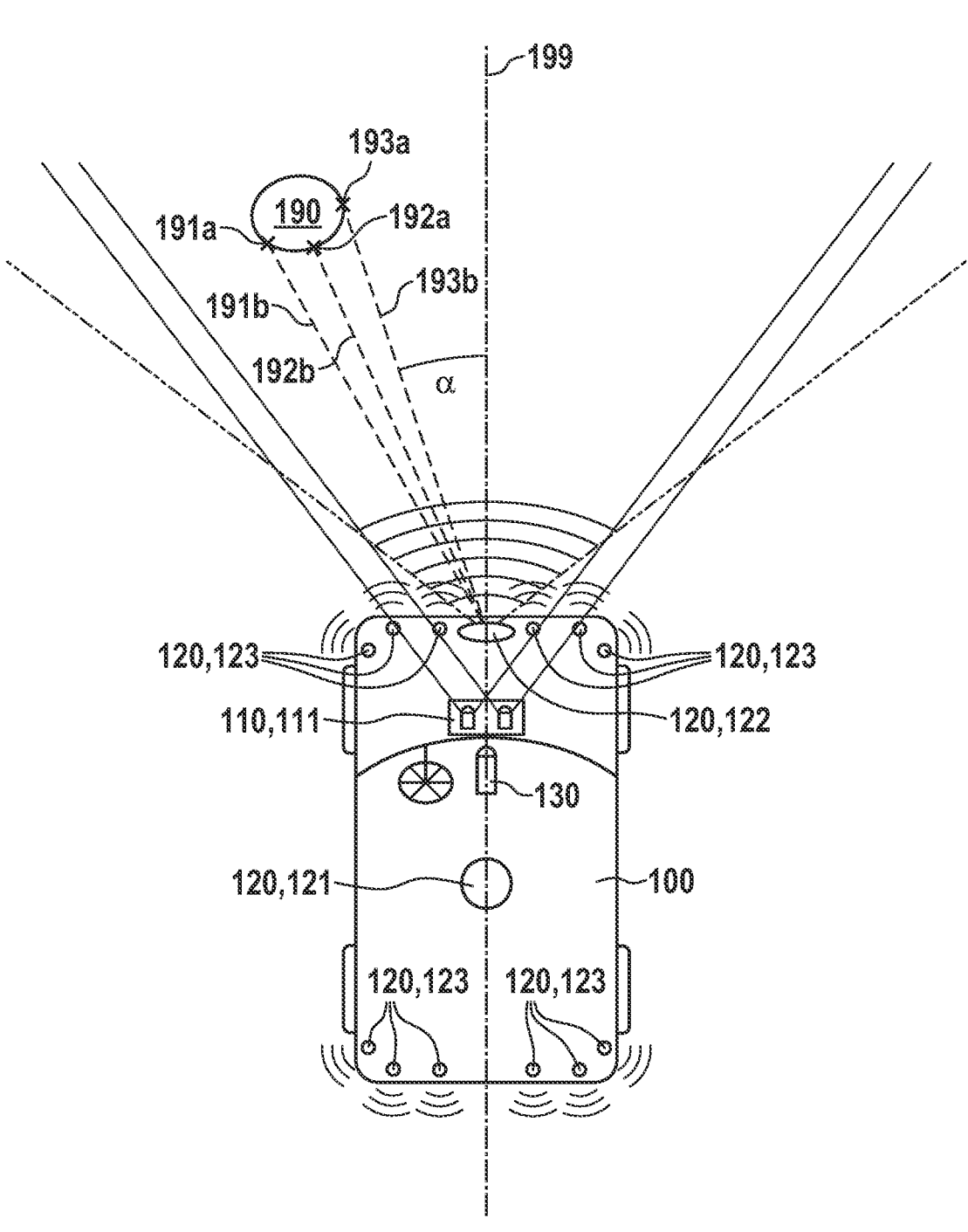
FIG. 1 shows a vehicle according to an example embodiment of the present invention.

A motor vehicle 100 is schematically shown in FIG. 1. The vehicle 100 comprises a stereo camera 111 as a vehicle camera 110 and three types of distance sensors 120, wherein a lidar sensor 121 and a radar sensor 122 and several ultrasonic sensors 123 are provided as distance sensors 120. In this exemplary embodiment, the vehicle 100 is used to generate training data for the mono vehicle camera, which in this exemplary embodiment is oriented forward and is thus used as the vehicle target sensor 130. In other words, in this example, the camera images of the mono vehicle camera are labeled as sensor target data of the vehicle target sensor 130 by the method according to the present invention. During a movement of the vehicle 100, a map, or an environment representation, is continuously generated, or extended, as a function of the camera images of the stereo camera 111 as the vehicle camera 110. This generated map, or generated environment representation, is continuously adjusted as a function of the distance data of the distance sensors 120. For example, an object 190 is present in the environment of the vehicle 100. The object 190 is, for example, a pedestrian. The object 190 is captured by means of the vehicle camera 110, or stereo camera 111, since the object 190 is within the coverage range of the vehicle camera 110. Based on the camera image of the vehicle camera 110, a neural network recognizes, or classifies, the object 190 as a pedestrian and ascertains an estimated position of the recognized object 190, wherein a probability of the classification is ascertained, for example. In addition, the environment representation is generated with points of the environment representation, in particular the map is generated with map points, relative to the vehicle 100, wherein these points, or map points, for example, represent the captured object points 191a, 192a and 193a and their respective distance to the vehicle 100. The distances of the object points 191a, 192a and 193a can be ascertained by a stereo method, wherein a correlation of pixels in the two simultaneously captured camera images and a triangulation are in particular carried out since the distance between the two cameras of the stereo camera 111 is known. The recognized object is mapped as a classification to the map points. The object 190 is, for example, additionally captured by means of the radar sensor 123 as the distance sensor 120. For example, a sent radar signal is reflected on the object points 191a, 192a and 193a and received as a reflection signal by the radar sensor 123. The distance of the object points 191a, 192a and 193a can be ascertained from the transit time from the sending of the radar signal to the reception of the reflection signal. The position of the map points is then shifted, or adjusted, in particular as a function of the ascertained distance of the object points 191a, 192a and 193a in the respective capture direction 191b, 192b or 193b since the ascertained distance data of a radar sensor 123, or a distance sensor 120, are more accurate and more weather-independent than the distances ascertained by a stereo method. The reflection signal typically has different properties depending on the object on which it was reflected. For example, the amplitude of a reflection signal on a bush is typically significantly smaller than the reflection signal on a wall. For example, multiple reflections occur on objects having several edges and straight surfaces, such as curbs. By taking the reflection properties into account in the adjustment, an association of the classified map point with respective distance data of the radar sensor 122 as the distance sensor 120 can be validated or prevented; this, in particular, takes place through a machine recognition method, for example a neural network. In other words, the distance of the map point to the vehicle is thus advantageously only adjusted if a reflection property of a distance measurement of the radar sensor 122 as the distance sensor 120 can be correlated with the classification of the map point.

Figure 2:
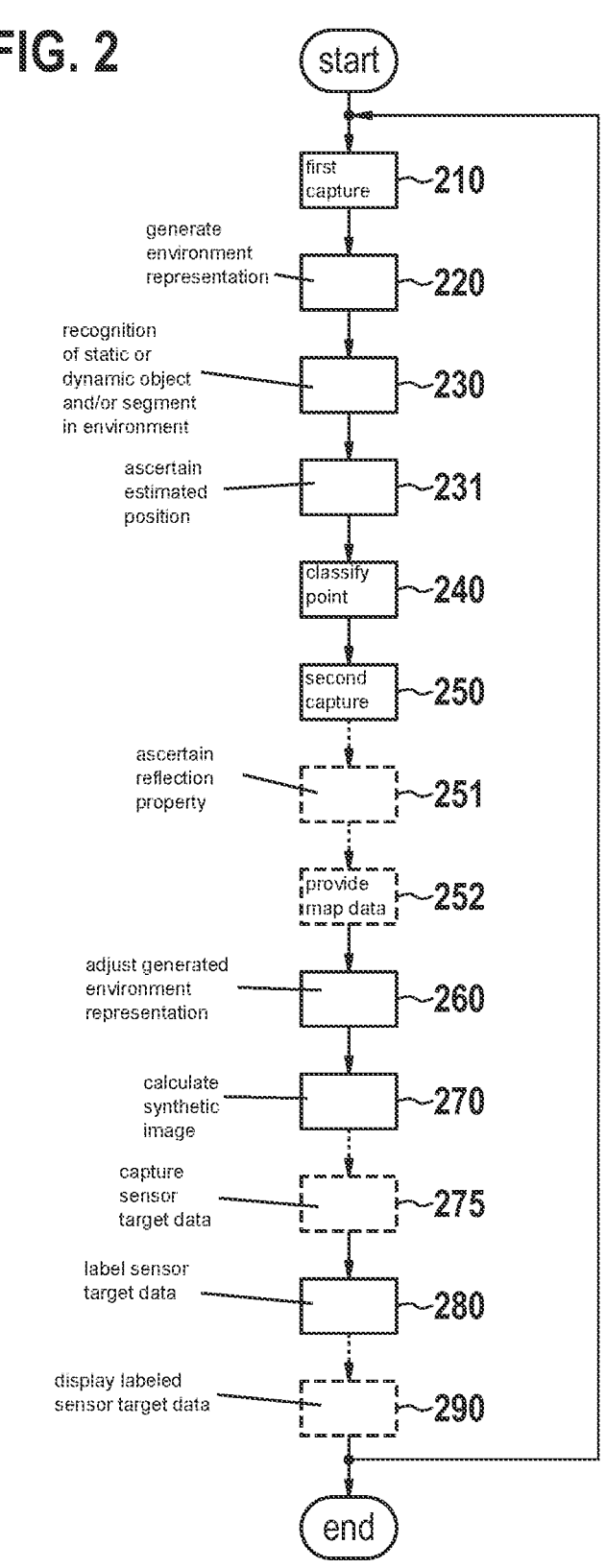
FIG. 2 shows a method sequence according to an example embodiment of the present invention.

FIG. 2 schematically shows a method sequence for automatic object and/or segment labeling of sensor target data of a vehicle target sensor as a block diagram of an exemplary embodiment. The method comprises a first capture 210 of at least one sequence of camera images by means of the vehicle camera 110. Subsequently, in step 220, the environment representation of the vehicle 100, in particular the map of the environment of the vehicle 100, is generated as a function of the captured sequence of camera images; in particular, the environment representation, or map, is generated relative to the vehicle 100 and is continuously extended with a movement of the vehicle 100. Furthermore, the method comprises a recognition 230 of at least one static or dynamic object and/or of a segment in the environment of the vehicle 100 by a learned machine recognition method, in particular a neural network, as a function of at least one captured camera image of the vehicle camera 110. In addition, an ascertaining 231 of an estimated position of the recognized static or dynamic object and/or of a position range of the recognized segment in the environment of the vehicle 100 takes place in each case as a function of the at least one camera image. Thereafter, in step 240, at least one point of the environment representation, or a map point of the generated map, is classified based on the recognized object and the ascertained estimated position of the recognized object and/or based on the recognized segment and the ascertained position range of the segment. In other words, the recognized object is mapped based on the ascertained estimated position of the recognized object, and/or the recognized segment is mapped based on the ascertained position range of the segment, to the respective point of the environment representation, or map point of the generated map, and is saved. In a further method step 250, a second capture of distance data is carried out by means of the at least one distance sensor 120. It may be provided in the optional step 251 that at least one reflection property is ascertained, or determined, as a function of the captured distance data. Thereafter, the generated environment representation, or map, is adjusted in step 260 as a function of the captured distance data. The generated environment representation, or map, may optionally be adjusted in step 260 as a function of the ascertained reflection property. The adjustment 260 of the map by changing a position of a point of the environment representation, or map point, as a function of a distance takes place, for example, only if the reflection property of the distance data for this point correlates with the mapped camera-based classification of the map point. The adjustment 260 therefore advantageously takes place if the same object or segment is mapped to this map point by the camera images and the distance sensor, i.e., the association with one another is likely, or validated. This adjustment 260 of the environment representation, or map, can advantageously take place by changing a position of a point of the environment representation, or map point, in the respective capture direction 191*b*,

192*b*, 193*b* of the respective distance sensor 120 to the respective point, or map point, as a function of the distance, captured in this capture direction, of the captured distance data and/or as a function of a distance, statistically averaged in a range around this capture direction, of the captured distance data of the respective distance sensor, wherein distance data of different distance sensors 120 can optionally be averaged or weighted depending on weather information. The weather information is, for example, received or loaded from an electronic memory. It may furthermore be optionally provided that the adjustment 260 of the generated environment representation, or map, additionally takes place as a function of provided map data. The optional provision 252 of map data of a map service takes place, in particular, by loading the map data from a memory or receiving the map data from a server device. Subsequently, in step 270, a synthetic image of the environment from a virtual perspective of observation is calculated based on the adjusted map, wherein the virtual perspective of observation represents a position and an orientation of the vehicle target sensor 130 on the vehicle 100. The synthetic image calculated in step 270 also comprises the classification of the map points and/or distance or depth information as additional information for a respective pixel, corresponding to a map point, of the synthetic image. Based on the fixed attachment position and the fixed orientation of the vehicle target sensor 130, the calculation 270 of the synthetic image advantageously takes place by a fixed mapping rule for the virtual perspective of observation based on the adjusted map. Thereafter, a labeling 280 of the sensor target data takes place based on the calculated synthetic image. The vehicle target sensor 130 whose sensor target data are labeled is preferably the vehicle camera 110 and/or the at least one distance sensor 120 and/or another sensor of the vehicle 100. If the vehicle target sensor 130 is another sensor of the vehicle 100, for example the mono vehicle camera, an optional capture 275 of the sensor target data of the environment of the vehicle 100 is carried out by means of the vehicle target sensor 130. Alternatively, the sensor target data can, accordingly, in particular be the camera images of the vehicle camera 110 or the distance data of a distance sensor 120. The labeling 180 of the captured sensor target data based on the calculated synthetic image advantageously takes place by mapping the synthetic image to the sensor target data at least during one capture time period, wherein the additional information of the synthetic image is transferred to the sensor target data based on the pixel coordinates. The labeling 280 of the captured sensor target data based on the calculated synthetic image preferably takes place with a time delay. In the subsequent optional step 290, the labeled sensor target data of the vehicle target sensor 130 may be displayed for a user of the vehicle 100. Preferably, the sensor target data labeled by the method are used to train a machine recognition method, in particular a neural network.

Figure 3:
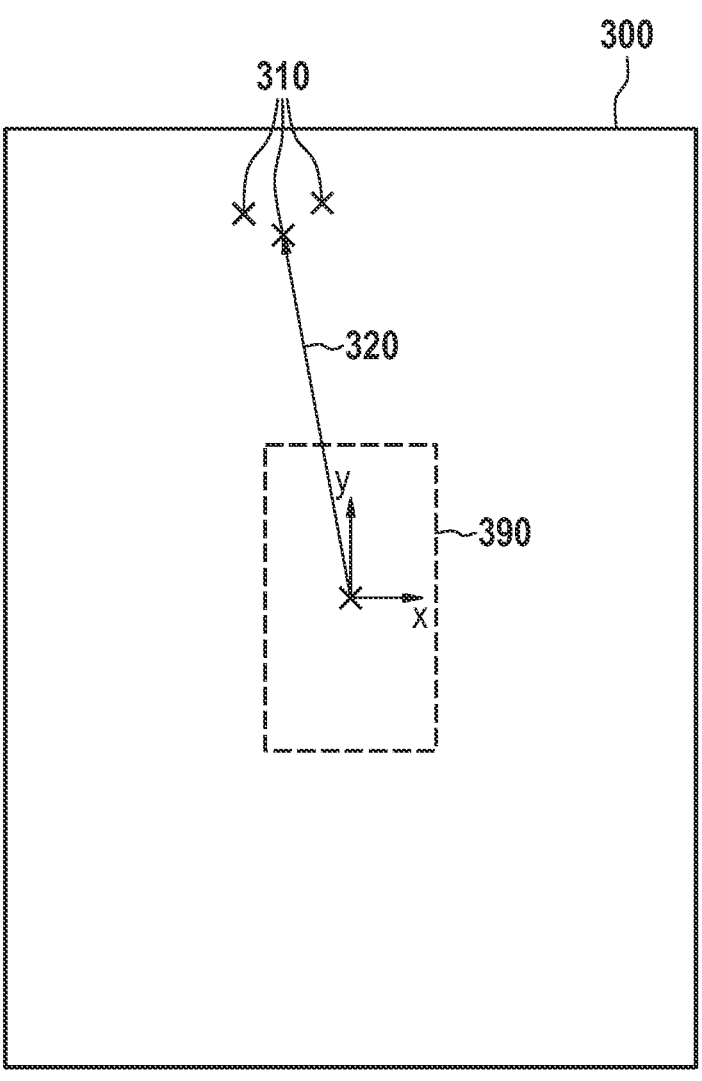
FIG. 3 shows a map with map points, according to an example embodiment of the present invention.

FIG. 3 schematically shows a map 300 with map points 310 as an environment representation, such as is generated in step 220 based on a driving situation, as shown in FIG. 1. The map points 310 have coordinates (x, y), or a position; in particular, this position is defined relative to vehicle 100, in particular relative to the center point of the vehicle 100, wherein the map points 310 were first ascertained, or generated, for example by a stereo method based on camera images of a stereo camera or by a structure-from-motion method based on a sequence of camera images during a movement of the vehicle 100, as a function of the camera images captured in step 210. In this respect, the two-dimensional representation is merely to be seen as an example since the environment representation, or map, can advantageously be generated as a three-dimensional representation with pixel-based height information. The map points 310 thus represent object points 191a, 192a, 193a of static and/or dynamic objects 190 in the environment of the vehicle 100. It may be provided that map points 310 for segment mapping are generated and that this classification is mapped. The segment mapping may represent a roadway, or road surface, i.e., a map point 310 of the map 300 does not need to represent occupancy at this location in the environment but may also represent mere information for classifying the segment at this position. The map 300 is in particular continuously adjusted or changed relative to a movement of the vehicle 100. The map points 310 first ascertained, or generated, in a camera-based manner have a high accuracy or a low positioning error with respect to the angular position a relative to the longitudinal axis 199 of the vehicle 100 (see FIG. 1). On the other hand, the map points 310 ascertained in a camera-based manner typically have a relatively large positioning error with respect to the distance 320 to the vehicle 100. The ascertained positions of the map points 310 are therefore advantageously adjusted in step 260 as a function of the distance data captured in step 250, whereby the positioning error of the respective map point 310 with respect to the distance 320 to the vehicle 100 is reduced. The correction of the position of the map points 310 preferably takes place in each case in the capture direction 191b, 192b, 193b of the respective distance sensor 120. In the center of the map, a dashed area 390 representing the position of the vehicle 100 is shown in FIG. 3.

Figure 4:
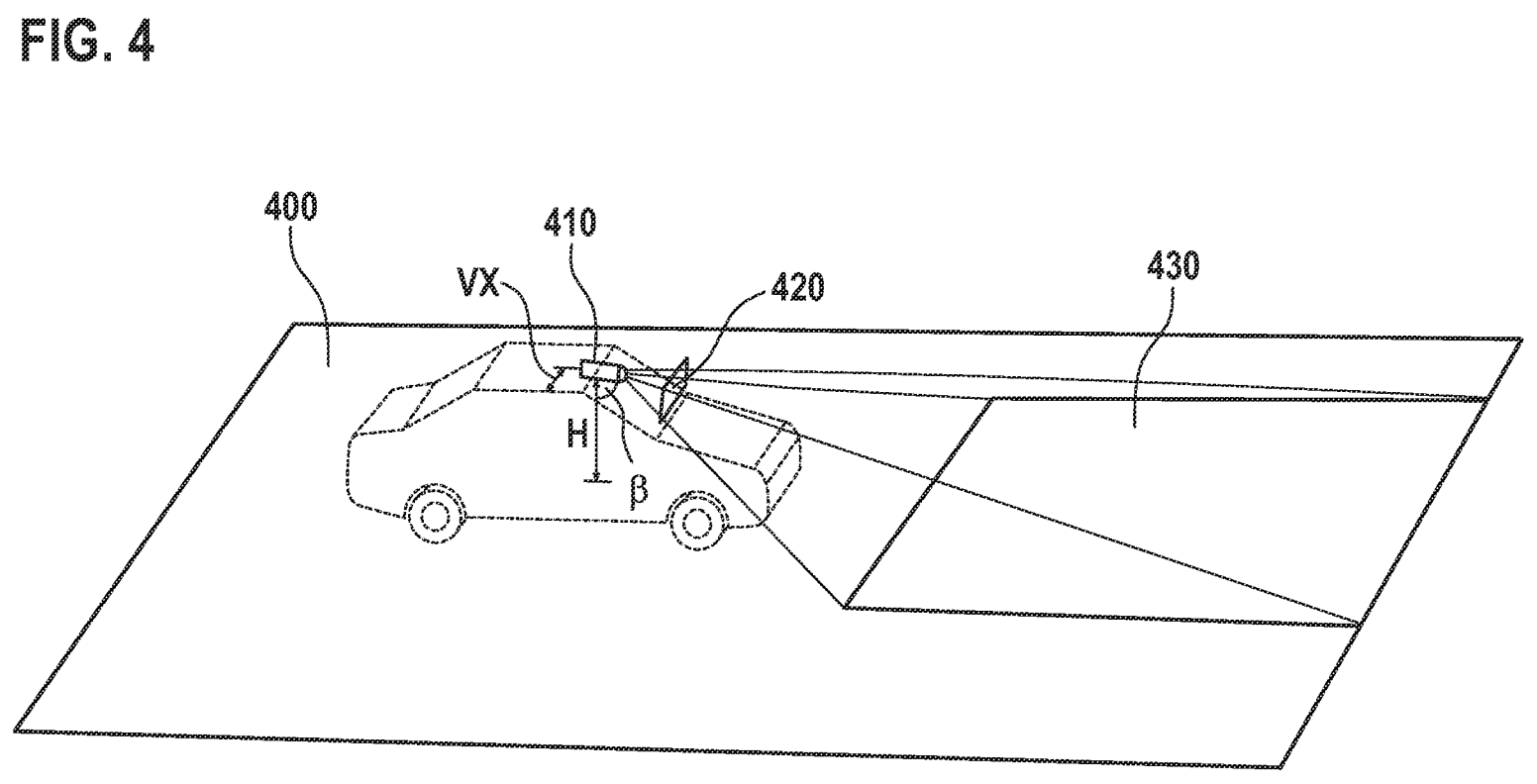

FIG. 4 schematically shows a three-dimensional side view of a virtual perspective of observation 410 toward a two-dimensional map section 400 of the map 300 as an environment representation. The virtual perspective of observation 410 represents the orientation, or perspective of capture, in particular the angular position 13 thereof, and the attachment position, in particular the height H and vertical position VX of the vehicle target sensor 130 on the vehicle 100. The environment representation, or map 300, or the map section 400 is known after steps 120 and 150. The orientation and the attachment position of the vehicle target sensor 130 are likewise known as a result of the assembly of the same on the vehicle 100. The virtual perspective of observation 410 represents this orientation and attachment position and is consequently defined or set or predetermined thereby. The synthetic image 420 represents the captured image of the coverage range 430 by means of the vehicle target sensor 130. The synthetic image is calculated as a function of the virtual perspective of observation 410 and the environment representation, or map 300. The sensor target data can then be labeled with the synthetic image 420. Thus, in particular, the additional information for static and/or dynamic objects is automatically mapped to the sensor target data; optionally, the additional information may comprise depth information (depending on the vehicle target sensor 130).

What is claimed is:

1. A method for automatic object and/or segment labeling of sensor target data of at least one vehicle target sensor, wherein the vehicle includes at least one vehicle camera and one distance sensor, the method comprising the following steps:

first capturing at least one sequence of camera images using the vehicle camera;

generating an environment representation of the vehicle as a function of the captured sequence of camera images, the environment presentation including an at least two-dimensional map;

recognizing at least one object and/or a segment in an environment of the vehicle, as a function of at least one captured camera image;

ascertaining an estimated position of the recognized object and/or a position range of the recognized segment in the environment of the vehicle as a function of the at least one camera image, relative to the vehicle;

classifying at least one point of the generated environment representation based on the recognized object and the ascertained estimated position and/or based on the recognized segment and the ascertained position range; and second capturing of distance data using at least one distance sensor;

determining at least one reflection property as a function of the captured distance data;

adjusting the generated environment representation as a function of the captured distance data;

calculating a synthetic image of the environment from a virtual perspective of observation based on the adjusted environment representation, wherein the classification of the at least one point of the environment representation is mapped to corresponding pixels of the synthetic image as additional information; and labeling the sensor target data of the vehicle target sensor based on the calculated synthetic image, wherein the generated environment representation is adjusted additionally as a function of the determined reflection property, using a learned machine recognition method, wherein a position of a point of the environment representation in a capture direction of the distance sensor is adjusted as a function of the distance when the reflection property of the distance data at the point correlates with the mapped classification.

2. The method according to claim 1, wherein the adjustment of the environment representation takes place by changing the position of the point of the environment representation in the capture direction of the distance sensor to a respective point as a function of a distance captured in the capture direction of the captured distance data and/or as a function of a distance statistically averaged in a range around the capture direction of the captured distance data.

3. The method according to claim 1, wherein the vehicle target sensor whose sensor target data are labeled is:

the vehicle camera, and/or the distance sensor, and/or another sensor of the vehicle, wherein an additional further capture of the sensor target data from the environment of the vehicle using the other sensor.

4. The method according to claim 1, further comprising the following steps:

providing map data of a map service; and adjusting of the generated environment representation additionally as a function of the provided map data.

5. The method according to claim 1, further comprising the following step:

displaying the labeled sensor target data of the vehicle target sensor for a user of the vehicle.

6. The method according to claim 1, wherein the calculation of the synthetic image takes place through a mapping rule for a virtual perspective of observation based on the adjusted environment representation.

7. A method for automatic object and/or segment labeling of sensor target data of at least one vehicle target sensor, wherein the vehicle includes at least one vehicle camera and one distance sensor, the method comprising the following steps:

first capturing at least one sequence of camera images using the vehicle camera;

generating an environment representation of the vehicle as a function of the captured sequence of camera images, the environment presentation including a map;

recognizing at least one object and/or a segment in an environment of the vehicle, as a function of at least one captured camera image;

ascertaining an estimated position of the recognized object and/or a position range of the recognized segment in the environment of the vehicle as a function of the at least one camera image, relative to the vehicle;

classifying at least one point of the generated environment representation based on the recognized object and the ascertained estimated position and/or based on the recognized segment and the ascertained position range; and second capturing of distance data using at least one distance sensor;

adjusting the generated environment representation as a function of the captured distance data;

calculating a synthetic image of the environment from a virtual perspective of observation based on the adjusted environment representation, wherein the classification of the at least one point of the environment representation is mapped to corresponding pixels of the synthetic image as additional information; and labeling the sensor target data of the vehicle target sensor based on the calculated synthetic image, wherein the labeling of the captured sensor target data based on the calculated synthetic image takes place as a function of a predetermined frequency, wherein the first capture and the second capture are carried out at a higher frequency than the predetermined frequency.

8. The method according to claim 1, wherein the labeling of the captured sensor target data based on the calculated synthetic image takes place with a time delay.

9. The method according to claim 1, further comprising: using the labeled sensor target data to train a machine recognition method.

10. A non-transitory computer-readable medium on which is stored a computer program including instructions for automatic object and/or segment labeling of sensor target data of at least one vehicle target sensor, wherein the vehicle includes at least one vehicle camera and one distance sensor, the instructions, when executed by a computer, causing the computer to perform the following steps:

first capturing at least one sequence of camera images using the vehicle camera;

generating an environment representation of the vehicle as a function of the captured sequence of camera images, the environment presentation including an at least two-dimensional map;

recognizing at least one object and/or a segment in an environment of the vehicle, as a function of at least one captured camera image;

ascertaining an estimated position of the recognized object and/or a position range of the recognized segment in the environment of the vehicle as a function of the at least one camera image, relative to the vehicle;

classifying at least one point of the generated environment representation based on the recognized object and the ascertained estimated position and/or based on the recognized segment and the ascertained position range; and second capturing of distance data using at least one distance sensor;

determining at least one reflection property as a function of the captured distance data;

adjusting the generated environment representation as a function of the captured distance data;

calculating a synthetic image of the environment from a virtual perspective of observation based on the adjusted environment representation, wherein the classification of the at least one point of the environment representation is mapped to corresponding pixels of the synthetic image as additional information; and labeling the sensor target data of the vehicle target sensor based on the calculated synthetic image, wherein the generated environment representation is adjusted additionally as a function of the determined reflection property, using a learned machine recognition method, wherein a position of a point of the environment representation in a capture direction of the distance sensor is adjusted as a function of the distance when the reflection property of the distance data at the point correlates with the mapped classification.

11. A control device or central or zonal computing module, comprising:

a first signal input configured to provide a first signal representing at least one sequence of camera images that is captured using a vehicle camera of a vehicle;

a second signal input configured to provide a second signal representing distance data captured using at least one distance sensor; and a computing unit configured for automatic object and/or segment labeling of sensor target data of at least one vehicle target sensor, wherein the vehicle includes the vehicle camera and the at least one distance sensor, the computing unit configured to:

generate an environment representation of the vehicle as a function of the captured sequence of camera images, the environment presentation including an at least two-dimensional map, recognize at least one object and/or a segment in an environment of the vehicle, as a function of at least one captured camera image, ascertain an estimated position of the recognized object and/or a position range of the recognized segment in the environment of the vehicle as a function of the at least one camera image, relative to the vehicle, classify at least one point of the generated environment representation based on the recognized object and the ascertained estimated position and/or based on the recognized segment and the ascertained position range, determine at least one reflection property as a function of the captured distance data, adjust the generated environment representation as a function of the captured distance data, calculate a synthetic image of the environment from a virtual perspective of observation based on the adjusted environment representation, wherein the classification of the at least one point of the environment representation is mapped to corresponding pixels of the synthetic image as additional information, and label the sensor target data of the vehicle target sensor based on the calculated synthetic image, wherein the generated environment representation is adjusted additionally as a function of the determined reflection property, using a learned machine recognition method, wherein a position of a point of the environment representation in a capture direction of the distance sensor is adjusted as a function of the distance when the reflection property of the distance data at the point correlates with the mapped classification.

12. A vehicle, comprising:
a control device or central or zonal computing module, including:
  a first signal input configured to provide a first signal representing at least one sequence of camera images that is captured using a vehicle camera of the vehicle;
  a second signal input configured to provide a second signal representing distance data captured using at least one distance sensor; and
  a computing unit configured for automatic object and/ or segment labeling of sensor target data of at least one vehicle target sensor, wherein the vehicle includes the vehicle camera and the at least one distance sensor, the computing unit configured to:
    generate an environment representation of the vehicle as a function of the captured sequence of camera images, the environment presentation including an at least two-dimensional map,
    recognize at least one object and/or a segment in an environment of the vehicle, as a function of at least one captured camera image,
    ascertain an estimated position of the recognized object and/or a position range of the recognized segment in the environment of the vehicle as a function of the at least one camera image, relative to the vehicle, classify at least one point of the generated environment representation based on the recognized object and the ascertained estimated position and/ or based on the recognized segment and the ascertained position range, determine at least one reflection property as a function of the captured distance data, adjust the generated environment representation as a function of the captured distance data, calculate a synthetic image of the environment from a virtual perspective of observation based on the adjusted environment representation, wherein the classification of the at least one point of the environment representation is mapped to corresponding pixels of the synthetic image as additional information, and label the sensor target data of the vehicle target sensor based on the calculated synthetic image, wherein the generated environment representation is adjusted additionally as a function of the determined reflection property, using a learned machine recognition method, wherein a position of a point of the environment representation in a capture direction of the distance sensor is adjusted as a function of the distance when the reflection property of the distance data at the point correlates with the mapped classification.

* * * * *